Jan. 6, 1959 C. L. OTTO ET AL 2,867,222
CORE MEMBER OF FOAM MATERIAL FOR HAIR CURLERS
Filed June 1, 1955
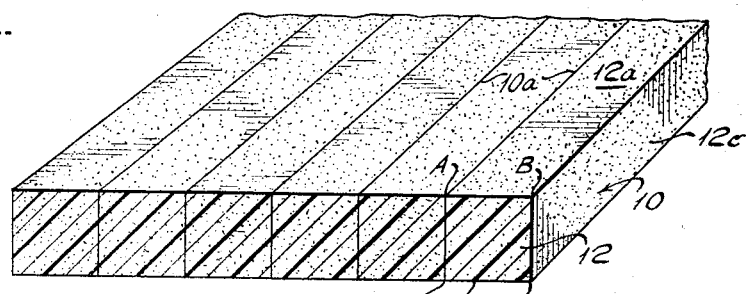
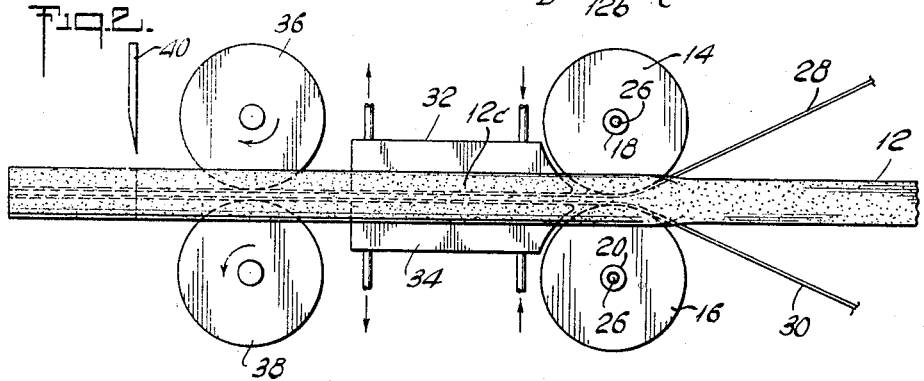
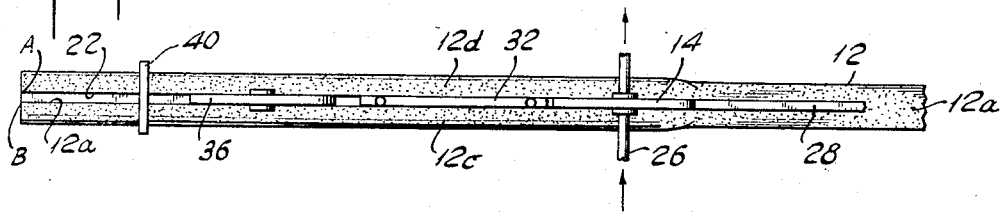
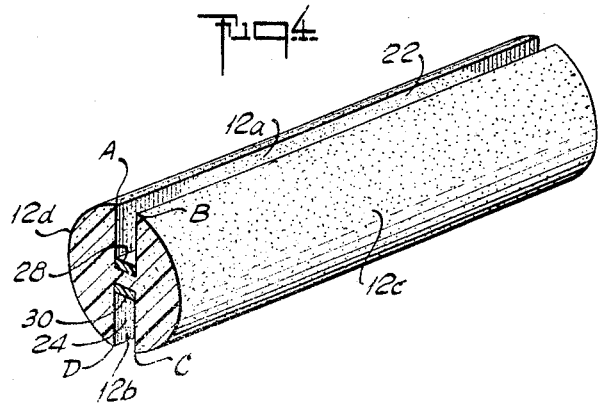
INVENTORS

2,867,222

CORE MEMBER OF FOAM MATERIAL FOR HAIR CURLERS

Carl Louis Otto, La Nelle Burnham Otto, and Joan Briton, New York, N. Y., assignors to Caronelle, Inc., New York, N. Y., a corporation of New York Application June 1, 1955, Serial No. 512,519

10 Claims. (Cl. 132—39)

The present invention relates to articles of reinforced foam material and to the manufacture thereof, and has particular reference to such articles in which the foam material is of resiliently elastic nature, while the reinforcement is provided by a stiffer material. More particularly the invention relates to such articles suitable for use as the core members of hair curlers adapted to be utilized in conjunction with suitable retaining elements. Such core members are ordinarily of cylindrical form and may be employed in conjunction with various forms of retainers, such as those disclosed in U. S. application Serial No. 456,485 filed September 16, 1954, in the names of Carl Louis Otto and La Nelle Burnham Otto, now matured into U. S. Patent No. 2,842,140, granted July 8, 1958.

Core members of the kind under consideration may advantageously be made of resiliently elastic foam material of various synthetic substances, but for the type of article to which the present invention is primarily directed, cost is a factor of paramount importance and the production of foam materials in cylindrical form suitable for core members for hair curlers and the like ordinarily involves costs due to wastage of material and other factors which render such elements relatively expensive.

It is the general object of the present invention to provide a novel form of core member of foam material suitable for the intended use which shall be not only satisfactory for the purpose but relatively cheaper than the product produced by prior art methods, and also to provide novel method and means for the manufacture thereof.

The manner in which the above stated general object and other and more detailed objects hereinafter appearing, may be obtained, will best be understood from a consideration of the ensuing portion of this specification taken in conjunction with the accompanying drawings forming a part hereof in which:

Fig. 1 is a fragmentary perspective view of a sheet or slab of foam material from which core members may advantageously be made in accordance with the principles of the present invention;

Fig. 2 is a more or less diagramamtic elevation of an apparatus for producing core members from material of the kind shown in Fig. 1, in accordance with the principles of the invention;

Fig. 3 is a top plan view of the apparatus shown in Fig. 2; and

Fig. 4 is a perspective view of one embodiment of a core member made in accordance with the invention.

Referring now more particularly to the drawings, Fig. 1 shows a sheet or slab of resiliently elastic foam material indicated generally at 10. Such material may be of any one of various synthetic resins, such as various of the vinyl derivatives and other polyesters such as isocyanate and polyurethane, and also various forms of foam rubber, both natural and synthetic, all of which materials may be generically termed plastic foam.

The production of such materials in sheet form is ordinarily the least expensive, and in the art to which the present invention relates, the cost of production is a factor of major importance.

Assuming that the foam material is produced in sheet form, in order to produce articles of the desired kind, the sheet is first slit as indicated at 10a to provide rectangular blanks 12 of substantially square cross section. Obviously, blanks of such section can be produced in the first instance, but as previously noted, cost factors make it more expedient to form such blanks by slitting wide sheet material.

In order to form a substantially cylindrical core of the kind desired, in accordance with the principles of the present invention, a rectangular blank 12 is passed between a pair of cooperating rollers 14 and 16 driven from any suitable source of power through their respective shafts 18 and 20, as seen in Fig. 2, the rollers 14 and 16 being relatively very narrow as compared with the width of the blank 12, as seen from the roller 14 appearing in Fig. 3.

Rollers 14 and 16 are spaced so that, as the blank 12 is fed between them, the central portions of the opposed top and bottom faces 12a and 12b of the rectangular blank are compressed toward each other to produce a core having a cross section as illustrated in Fig. 4, from a rectangular blank 12 of the kind shown in Fig. 1, the corners A, B, C and D of such a blank, as shown in Fig. 1, being brought into the positions indicated at A, B, C and D respectively in the finished core. The lateral plane surfaces 12c and 12d, of which 12c appears in Fig. 1, are by this deformation brought to convexly curved form as seen in Figs. 3 and 4, the opposed faces 12a and 12b being deformed so that they form the side walls of opposed confronting slots 22 and 24.

Numerous of the synthetic plastic materials of the kind contemplated by the present invention and hereinbefore mentioned by way of example are heat sealable at relatively moderate temperatures, and for the purpose of stabilizing the foam material in the form desired, as, for example, shown in Fig. 4, rollers 14 and 16 are advantageously heated to a degree such that a permanent set will be given to the material, in the form which it assumes after passing through the rollers. The specific method of heating the rollers 14 and 16 is obviously a matter of selection and, by way of example, they may be readily maintained at desired temperature by being made of hollow form and having hot water, steam or other heated fluid circulated through them by introduction through the hollow cores 26 of the shafts. Alternatively, electric resistance or inductive heat may be employed for the rollers.

In some instances, the passing of the plastic foam material through the heated rollers may be sufficient to cause the treated blank to retain its desired finished cross-sectional form, as a result of the heat sealing of the foam material, but when the material is being formed for use as core members for hair curlers, longitudinal stiffening of the relatively very flexible foam material may be desirable, and in such case the narrow strips 28 and 30 of reinforcing material, which advantageously is substantially the same width as that of the forming rollers, may be fed between the forming rollers as shown in Fig. 2, and bonded to the foam material by heat sealing, suitable adhesives, or other appropriate means.

For the purposes of the present invention, the strips 28 and 30 may advantageously be of any one of a number of known thermoplastic materials such as the acetate and other derivatives of cellulose, polystyrene and other like materials. Obviously, if the required physical specifications can be met, only one rather than two strips may be employed, and such strips may be paper-backed or otherwise treated to fulfill the requirements necessary to produce a stabilized section with a compressed center such as is indicated generally in Fig. 4.

In cases where one or more reinforcing strips such as 28 and 30 are used, which are all plastic material having a relatively low temperature fusing point, and heat sealing is employed, it may be desirable to chill the composite product leaving the forming rollers. This may advantageously be done by water jacketed means diagrammatically illustrated in Fig. 2 wherein water jacketed chambers 32 and 34 extending into the slots produced by the forming rollers on the outlet side thereof are shown as being supplied by cooling fluid the flow of which is indicated by the arrows shown in the figure.

In some cases the forming rollers 14 and 16 may operate as feed rollers as well, and in other cases it may be found desirable to draw the material through the forming rollers by a separate set of feed rollers indicated at 36 and 38.

For completing the formed material into core members for curlers and the like, all that is required is that it be cut into suitable lengths and provision for such cutting has been indicated by the knife shown diagrammatically at 40 in Figs. 2 and 3.

As will be seen from Fig. 4, the core article produced is of generally convexly formed cylindrical shape, provided with confronting grooves, the latter being advantageously available as retaining slots for the fingers or prongs of retaining members, which may be of the kind disclosed in the aforementioned U. S. Patent No. 2,842,140.

Also, the core member, while being of highly porous foam material particularly adapted for the intended purpose, may readily be provided with the requisite longitudinal stiffness by virtue of one or more stiffening members, such as members 28 and 30 that not only provide mechanical stiffness, but also may aid, by heat or other sealing to the foam material, in maintaining the core member in its desired cross sectional shape.

While one specific example of article and manufacture thereof has been given by way of illustration, it will be obvious that the invention can be carried out in various other specific embodiments without departing from the scope of the invention which is to be understood as embracing all forms of product and manufacture thereof falling within the scope of the appended claims.

What is claimed is:

1. As a new article of manufacture, a member comprising a body of elastically resilient foam material of substantially uniform cross section along its length, said body having side portions each having a convexly curved outer surface and said side portions being separated by confronting slots, and means containing and reinforcing the foam material between said confronting slots.

2. An article as defined in claim 1 in which the foam material consists of a synthetic resin.

3. An article as defined in claim 2 in which the foam material consists of a polyester of the class consisting of isocyanate and polyurethane.

4. As a new article of manufacture, a member comprising a body of elastically resilient foam material of substantially uniform cross section along its length, said body having side portions each having a convexly curved outer surface and said side portions being separated by confronting slots, and means containing and reinforcing the foam material between said confronting slots comprising a strip of material stiffer than said foam material attached to the foam material at the bottom of at least one of said slots.

5. An article as defined in claim 4 in which the strip of stiffening material is a synthetic thermoplastic.

6. An article as defined in claim 5 in which the strip of stiffening material is secured to the foam material by heat sealing.

7. An article as defined in claim 4 in which the strips of reinforcing material are fixed to the foam material at the bottoms of each of the confronting slots.

8. The method of forming a core member of foam material for hair curlers and the like which includes the steps of providing an elongated blank of elastically resilient foam material of polygonal cross section, passing the blank between confronting rollers substantially narrower than the blank and spaced to compress between them the center portions of opposite faces of the blank, whereby to distort the blank to produce a body having generally convexly curved lateral side faces, fixing the compressed foam material to retain the distorted shape of the blank and cutting the blank into desired lengths.

9. The method of forming a core member of foam material for hair curlers and the like which includes the steps of providing an elongated blank of elastically resilient foam material of rectangular cross section, passing the blank between confronting rollers substantially narrower than the blank and spaced to compress between them the center portions of opposite faces of the blank, whereby to distort the blank to produce a body having generally cylindrically curved lateral side faces, fixing the compressed foam material to retain the distorted shape of the blank and cutting the blank into desired lengths.

10. The method of forming a core member for hair curlers and the like which includes the steps of providing an elongated blank of heat-sealable elastically resilient plastic foam material, passing the blank between confronting heated rollers narrower than the blank and spaced apart to compress the central portions of opposite faces of the blank between the rollers, whereby to distort the blank to form convexly curved lateral side surfaces and to heat seal the foam material in its distorted form.

References Cited in the file of this patent

UNITED STATES PATENTS

| | | |
|---|---|---|
| 1,599,054 | Lehr | Sept. 7, 1926 |
| 2,061,356 | Gosewisch | Nov. 17, 1936 |
| 2,201,669 | Kraft | May 21, 1940 |
| 2,414,177 | Smith | Jan. 14, 1947 |
| 2,608,977 | Trippler | Sept. 2, 1952 |
| 2,630,809 | Lewis et al. | Mar. 10, 1953 |

OTHER REFERENCES

Monsanto Technical Bulletin No. P–144, "Isocyanate Foamed-In-Place Resins," Feb. 1, 1953.
Modern Plastics, "Polyurethane Resins," April 1954.
Modern Plastics, "Polyurethane," November 1954.